No. 93,795. J. F. BARKER & C. N. GILBERT. APPARATUS FOR CARBURETING AIR. PATENTED AUG. 17, 1869.
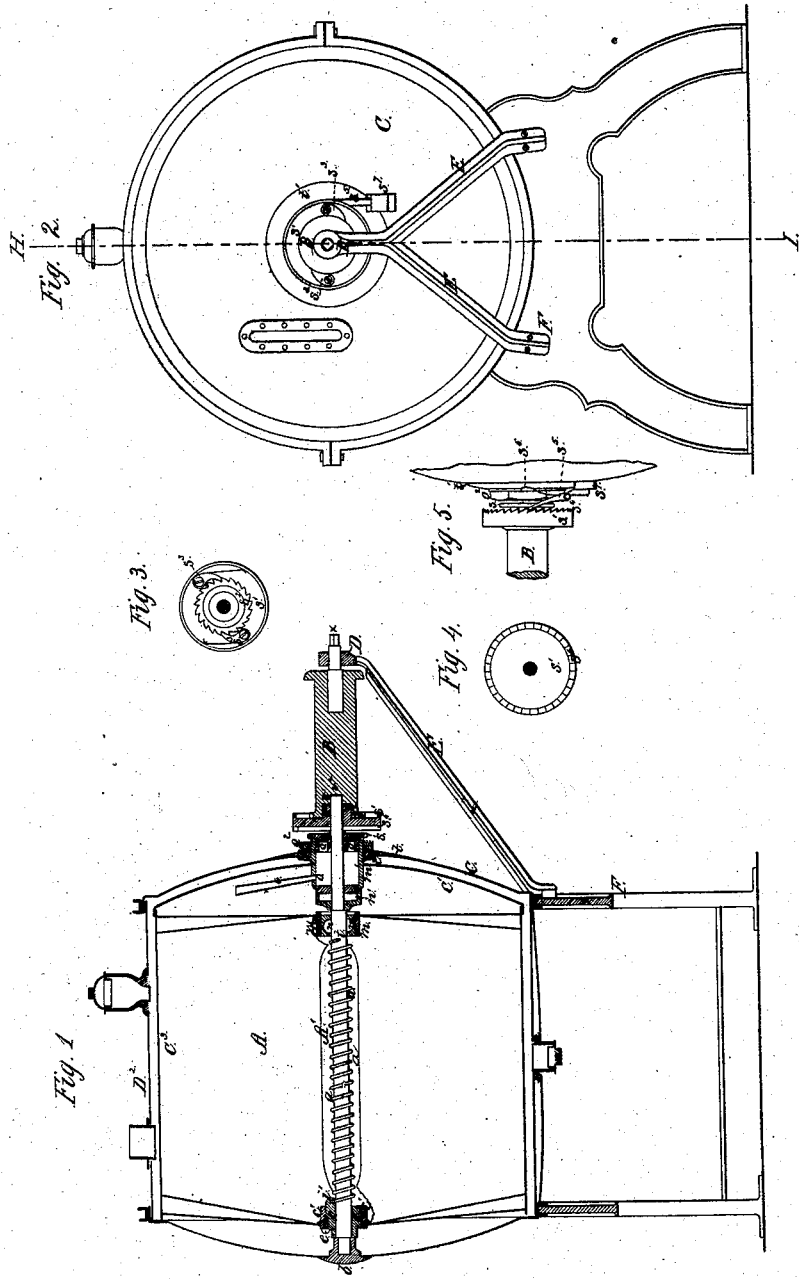

United States Patent Office.

J. F. BARKER, OF SPRINGFIELD, MASSACHUSETTS, AND C. N. GILBERT, OF NEW YORK, N. Y.

Letters Patent No. 93,795, dated August 17, 1869.

IMPROVED APPARATUS FOR CARBURETTING AIR.

The Schedule referred to in these Letters Patent and making part of the same.

*To all whom it may concern:*

Be it known that we, J. F. BARKER, of Springfield, in the county of Hampden, and State of Massachusetts, and C. N. GILBERT, of the city, county, and State of New York, have invented a new and useful Improvement in Apparatus for Carburetting Air; and we do hereby declare that the following is a full, clear, and exact description thereof, reference being had to the accompanying drawings, making a part of this specification, and to the letters of reference marked thereon, in which—

Figure 1 is a vertical section through line H I of fig. 2, showing details of construction of parts appertaining to the shaft and centre of the wheel or pump;

Figure 2 is an end view of the pump;

Figure 3 is an end view of the winding-drum, with the ratchet and pawls which actuate the shaft of the pump;

Figure 4 is a back view of the circular piece, to which the said pawls are attached, showing a ratchet upon the back of said circular piece; and Figure 5 is a side view, showing a portion of the end of the cylinder enclosing the wheel, and the connections with the winding-drum.

Our invention relates to that class of machinery used in carburetting air, or in driving air through a carburetter, to the burners; and consists in the arrangement and construction of the shaft of what is known as a meter-wheel, with its connecting parts, whereby the wheel, when made to revolve, during its ordinary operation, by means of a descending weight, shall be made to continue to revolve while said weight is being wound up, by means of a spring, in connection with suitable ratchets and pawls, as will hereinafter be explained.

That others skilled in the art may be able to make and use our invention, we will proceed to describe its construction and the mode of its operation.

In the drawings—

C represents the cylinder or casing of what is known as a meter-wheel or air-pump, A being the wheel itself, the general construction of said wheel, with its cylinder, being too well known to require further explanation.

$b$ represents a suitable bearing for the end of the shaft $h$, said bearing $b$ being properly secured to the end of the cylinder C.

$c'$ represents an annular ring, which is made fast to the end of the wheel A.

Fitted within this outer ring $c'$ is an inner ring, $c$, which is hollow, and made so that the shaft $h$ may turn freely therein; and upon the inner end of the ring $c$ is a small projection, $i'$, having a hole therein, into which is inserted and firmly secured, one end of the spiral spring $a$, which is wound around the shaft $h$, the other end of said spring being passed through a hole made in the shaft $h$, at $i$, or it may be otherwise properly secured.

The outer ring $m$ is firmly secured to the wheel A, and within said outer ring $m$, and turning freely therein, is the ring $n$, which is firmly secured to the shaft $h$.

$m'$ is a hollow ring, one end of which is closed, with the exception of an aperture, through which passes the shaft $h$, and in this closed end is a chamber, in which to place the packing $n'$, a screw-thread being cut on the interior surface of a portion of said chamber, and a threaded nut, $k$, made to fit therein, which nut, when turned in tightly, presses the packing $n'$ closely around the shaft $h$, preventing any egress of water from inside the pump.

The annular flange $t$ is made upon the exterior of the ring $m'$, and a screw-thread is cut upon both the inside and outside, at the outer end, a threaded nut, $o^2$, being made to fit the outer thread, and a nut, $s$, having the apertures $o^1$ therein, being made to fit the inner thread.

The chamber $o^3$ is left within the ring $m'$, with a pipe or tube, $o$, within the wheel A, at the top of the ring $m'$, to conduct the air, which enters the chamber $o^3$ through the apertures $o^1$, up into the wheel, above the water.

The plate $t'$ has a hole therein, into which fits the ring $m'$, the outer end of which is inserted into the hole in said plate, with the flange $t$ against the concave side of said plate, suitable packing being placed between the plate and flange, and the nut $o^2$ is then turned up tightly against the convex side of the plate, thus securing the ring $m'$ within the plate $t$.

The nut $s$ has an aperture in the centre, through which passes the shaft $h$.

The ratchet-wheel $s^1$ has the teeth $s^4$ upon one side, and upon the other side are secured one or more pawls, $s^3$, held in their desired position by means of screws or pivots $t^3$ and springs $t^4$, and a hub, $r$, is also made on one side of said wheel $s^1$, and a hole is made through said wheel $s^1$, through which passes the shaft $h$, and is firmly secured therein.

The winding-drum B is cylindrical, and of suitable length, and one end is counterbored, as shown at $v^2$, to furnish a bearing for the hub $r$, which moves freely in its said bearing $v^2$.

At one end of the drum B, near the wheel $s^1$, are the teeth $s^2$, with which the sharp ends of the pawls $s^3$ engage; and said drum B has a smaller counterbore, $v^2$, therein, in which the end of the shaft $h$ has its bearing.

The outer end of said drum may have an annular flange, $x^3$, thereon, and a small spindle, $x^4$, which has its bearing in the step D of the brace E, said brace being properly secured to the frame F; and the extreme outer end of said spindle $x^4$ may be prismatic in form, so that a winch may be readily applied, by which to turn the drum B, in the operation of winding up the cord upon said drum.

A pawl, $s^5$, is attached to the end of the cylinder C, being hinged at $s^7$, and the small or sharp end of said pawl is held against the teeth $s^4$ by the spring $s^6$.

Having thus described the construction of our invention, we will now proceed to describe the mode of its operation.

A winch being applied to the prismatic portion $x$, the drum B is rotated, and a suitable cord, which passes over pulleys, a weight being attached to one end of said cord, the other end being attached to said drum, is wound around said drum.

In this operation, the drum B does not operate to rotate the shaft $h$, as the pawls $s^3$ slide over the inclined portions of the teeth $s^2$ upon the end of the drum B, thus permitting an independent rotary motion of said drum, the end of the pawl $s^5$, on the end of the cylinder C, engaging with the teeth $s^4$, on the wheel $s^1$, and preventing any rotary movement of said wheel $s^1$.

When the power upon the winch is removed, the weight unwinds the cord from the drum, or causes the drum to rotate in an opposite direction. The ends of the pawls $s^3$ engaging with the teeth $s^2$, and the end of the pawl $s^5$ sliding over the inclined portions of the teeth $s^4$, and the wheel $s^1$ being secured to the shaft $h$, said shaft is caused to rotate, turning the wheel A also, and water having been placed in the said wheel A, reaching to a height sufficient to cover the space A' and the ring $m'$, as the wings of the said wheel A pass into the water, the air, which is in the upper part of the wheel, and between the wings, is forced out at one end of said wheel, a fresh supply of air coming in through the apertures, $o^1$, chamber $o^3$, and pipe $o$, to supply the place of that driven out.

When the weight and cord first begin to rotate the drum B and shaft $h$, said shaft is rotated more rapidly than is the wheel A, until the spring $a$ is wound tightly around the shaft, the resistance of the water within the wheel A, or within the cylinder, operating to cause the wheel A to rotate at a uniform rate.

When the spring $a$ is wound upon the shaft tightly, the wheel and shaft then revolve together until the weight has run down, or the cord is unwound.

If, however, as soon as the cord is thus unwound from the drum, by the force of the suspended weight, the winch is again applied, and the cord is again wound upon the drum, the spring $a$ begins to unwind itself from the shaft $h$ as soon as said shaft ceases its rotary motion, causing the wheel A to continue to revolve while the cord is being rewound upon the drum B, the arrangement of the spring with the shaft, operating to cause a continuous rotary motion of the wheel A, even while the shaft of said wheel may be temporarily stopped.

The operation of forcing air by means of a meter-wheel, has been long known and used; but we do not believe that a meter-wheel has ever before been arranged, when used as a pump, with motive-power applied to operate automatically, in forcing a constant and uninterrupted supply of air, as hereinbefore described.

In the construction of this wheel, we deem it best to proceed as follows:

The inner diameter of the ring $m'$ is a little greater than the outer diameter of the ring $c'$, so that the ring $c'$ may be readily passed through the ring $m'$, and a temporary wooden shaft is made of a size to fit the inner diameter of the two rings $c'$ and $m'$, which are then placed upon the wooden shaft, in the same position which they are to occupy when attached to the wheel.

The shaft, with the rings thereon, is then placed in a suitable position, and the wheel A is built upon the rings $c'$ and $m'$, being firmly secured thereto by soldering, or otherwise, and the wooden shaft is then withdrawn from the rings, and the permanent shaft $h$ is made, the two inner rings, $c$ and $n$ placed thereon, the ring $n$ being firmly secured in its position upon said shaft $h$, the ring $c$ being loose upon the shaft, and the spring $a$ is placed upon the shaft $h$, one end being secured to the ring $c$ at $i'$, and the other to the shaft $h$, at $i$, or to the ring $n$, and the shaft, with the rings $c$ and $n$ and the spring $a$ thereon, is then placed within the wheel A, the end of the shaft, with the ring $c$ and spring $a$ thereon, being passed through the outer ring $m'$, and the ring $n$ being inserted within the outer ring $m'$, and the said shaft is then secured within the wheel by means of a screw, $e$, inserted between the two rings $c$ and $c'$, or by a key or other suitable means.

The head $C^1$, having a hole therein sufficiently large to pass over the ring $m'$ freely, is then placed on the said ring, the tube $o$ is attached to the ring, and the head C is then secured to the shell $C^2$.

The head C, with the plate $t^1$ secured thereto, is then placed on the ring $m'$, and the nut $o^2$ turned on tightly, and the outer head C secured to the outer shell $D^2$, and the circular piece $s^1$ and drum B are properly secured in place.

It will be seen, that if the wheel A were used to force the air through the carburetter and pipes, to the burners, (which is the use to which we apply it,) without the spring $a$ attached, when power was applied to the winch to rewind the cord upon the drum while the gas was lighted at the burners, as it is often necessary to do, the wheel A would instantly stop its rotary motion as soon as the operation of rewinding the cord was commenced, and the supply of gas at the burners would be cut off, as the wheel would cease to force any air through the carburetter during the operation of rewinding the cord, and the lighted gas would be instantly extinguished.

Our invention totally obviates such a result, the spring $a$ operating to give a constant and uninterrupted supply of gas to the burners, while the cord is being rewound and the weight raised.

We are aware that a meter-wheel has long been used for forcing air, and we do not claim the same irrespective of our arrangement and construction; but having described our invention, What we do claim as new, and desire to secure by Letters Patent, is—

1. The combination of the helical spring $a$ with the ring $c$ and shaft $h$ or ring $n$, the whole constructed and operating substantially as and for the purpose herein described and specified.

2. A meter-wheel, having a shaft, $h$, in combination with the toothed drum B, wheel $s^1$, with its pawls $s^3$ and $s^5$, the rings $c$ $c'$ and $m'$ $n$, and spring $a$, all constructed and operating substantially as and for the purposes herein specified and described.

J. F. BARKER.

Witnesses:
T. A. CURTIS,
F. E. RICE.

C. N. GILBERT.

Witnesses:
LEVI GRAY,
WM. T. B. STORMS.